Aug. 25, 1942.　　　　G. H. MORSE　　　　2,294,199
CALCULATING INSTRUMENT
Filed March 19, 1941　　　　2 Sheets-Sheet 1
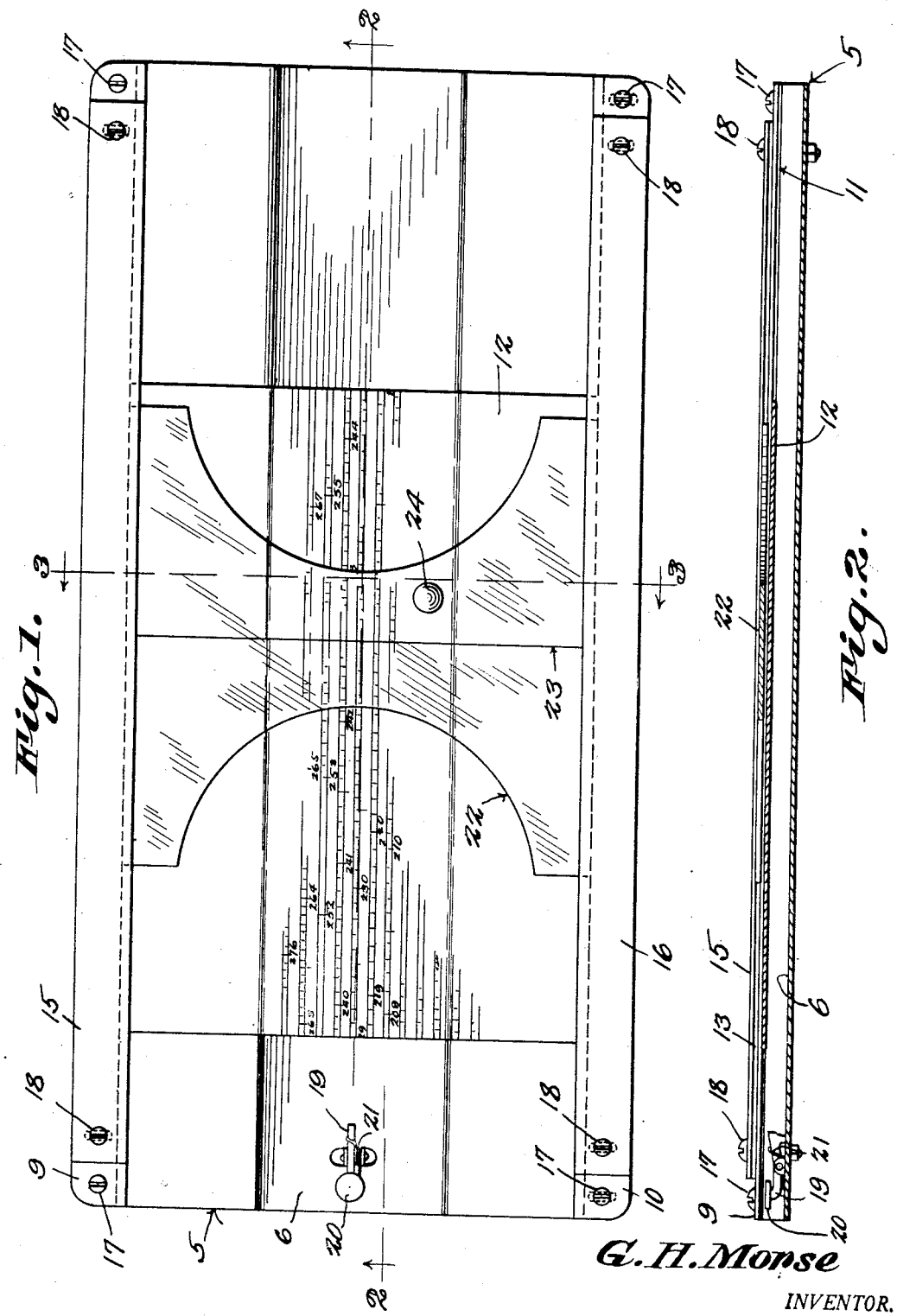
G. H. Morse
INVENTOR.
BY *CA Snowles*
ATTORNEYS.

Aug. 25, 1942.  G. H. MORSE  2,294,199
CALCULATING INSTRUMENT
Filed March 19, 1941  2 Sheets-Sheet 2
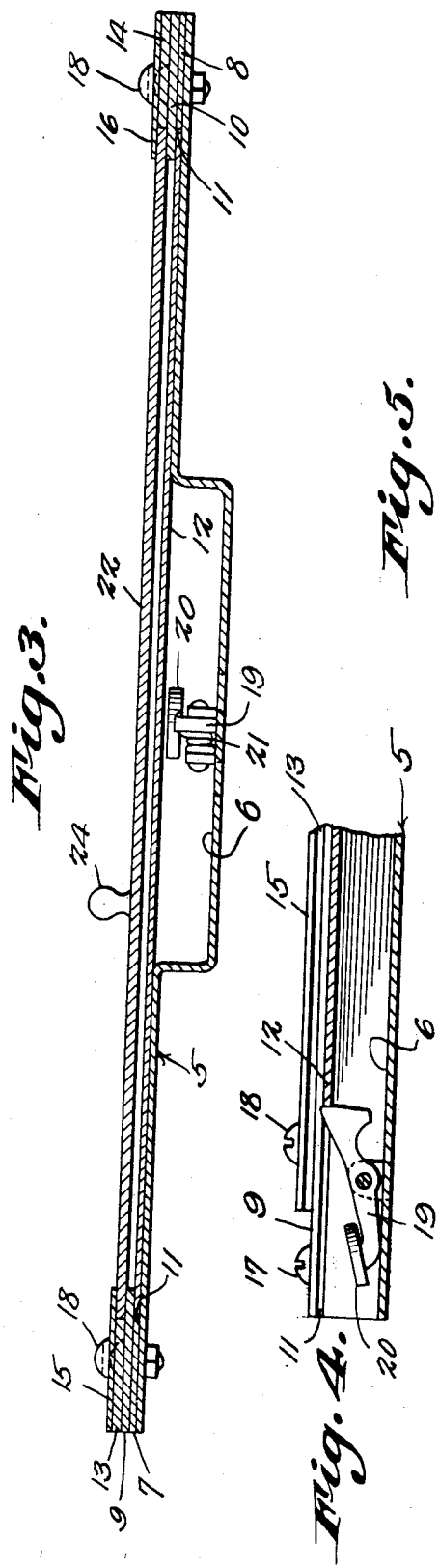
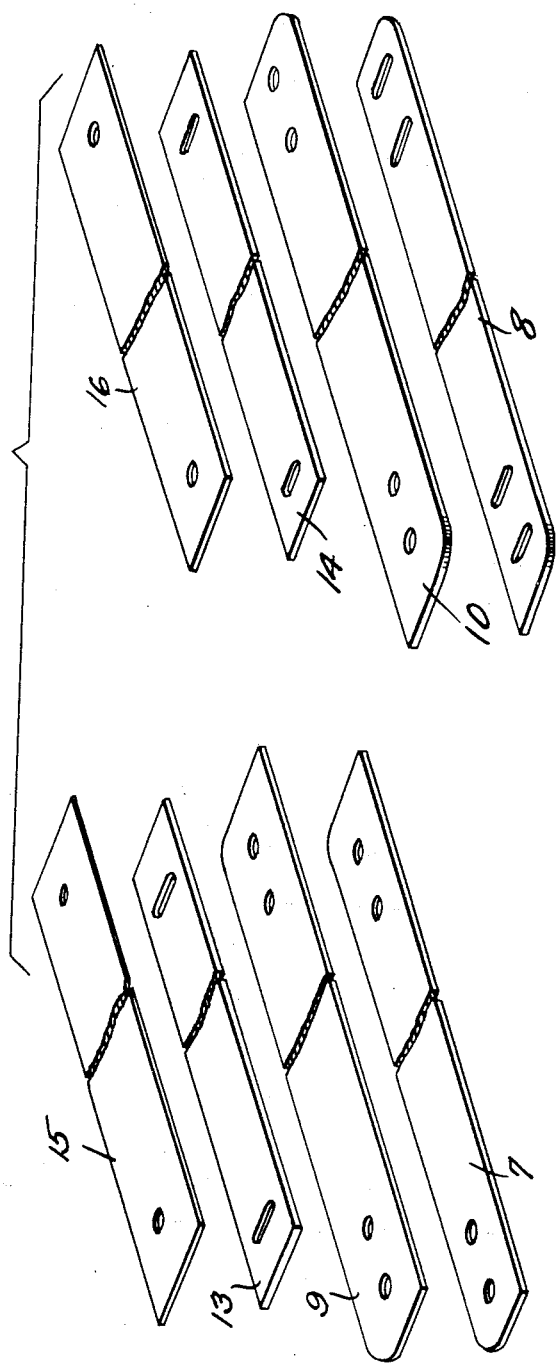
G. H. Morse
INVENTOR.
BY
ATTORNEYS.

Patented Aug. 25, 1942

2,294,199

UNITED STATES PATENT OFFICE 2,294,199

CALCULATING INSTRUMENT

George H. Morse, Arlington, Va.

Application March 19, 1941, Serial No. 384,192

3 Claims. (Cl. 235—70)

This invention relates to mechanical calculating devices, and particularly to calculating devices employing the principles of the slide rule.

An object of the invention is to provide a device of this character wherein the range of calculations will be appreciably increased over known calculating devices using the slide rule principle.

Another object of the invention is to provide a substantially wide movable member embodying a multiplicity of parallel lines graduated as a single logarithmic scale, and another scale of identical character but of approximately one-half the size of the larger scale, and by means of which factors consisting of indicated square roots, may be involved in computations made with the use of the present calculating device, embodied in this invention.

Still another object of the invention is to provide a calculating instrument embodying a cursor of a transparent nature, having an indicating line formed thereon and disposed at right angles to the edges of the cursor and adapted to cooperate with the graduations on the movable scale or scales of the instrument, in making calculations.

Another important object of the invention is to provide a body portion having a central longitudinal groove providing a clearance for the fingers of the operator, so that the operation of the movable elements of the device, may be accomplished accurately and with facility.

A further object of the invention is to provide a pivoted stop at one end of the body portion, adapted to be moved to engage one end of the scale member, holding the scale member in its initial position, during one step in the movement of the device to complete a calculation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a calculating instrument constructed in accordance with the invention.

Figure 2 is a longitudinal sectional view taken on line 2—2 of Figure 1.

Figure 3 is a transverse sectional view taken on line 3—3 of Figure 1.

Figure 4 is an enlarged sectional detail view illustrating the pivoted stop against which the movable member of the device engages, when moved to its initial position, in making a calculation.

Figure 5 is a view illustrating the various plates which are employed in providing the guides between which the movable members of the instrument are mounted.

Referring to the drawings in detail, the calculating instrument comprises a body portion indicated generally by the reference character 5, the body portion being substantially wide and provided with a central longitudinal depression 6.

The body portion is constructed preferably of sheet metal material, and the longitudinal depression 6 is formed by pressing the central portion of the plate downwardly, as clearly shown by Figure 3 of the drawings. This downwardly depressed portion provides the support for the body portion and at the same time forms a clearance in the upper surface of the body portion, for the fingers of the operator, permitting the operator to move the scale member, forming a part of the instrument, and to be hereinafter more fully described, with facility.

The calculating instrument includes a substantially wide sliding scale member 12 and a cursor, operating over the scale member. Because of the width of the scale member 12 it will be obvious that a plurality of scale lines may be arranged in parallel relation with respect to each other, so that the range of calculations will be increased appreciably over known calculating devices, wherein the slide rules are elongated, without the necessity of lengthening the rule. These movable members operate in guideways formed adjacent to the edges of the body portion. These guideways are formed by providing plates disposed longitudinally of the body portion, and arranged in spaced relation.

Plates 7 and 8 are positioned along the longitudinal edges of the body portion 5, so that the outer edges thereof, will be substantially flush with the outer edges of the body portion. Positioned on the plate 7, is a substantially wide plate 9, the outer edge of the plate 9 being substantially flush with the outer edge of the body portion, so that the inner longitudinal edge of the plate 9 extends over the inner longitudinal edge of the plate 7. At the opposite side of the body portion, is a plate 10 which is appreciably wider than the plate 8 on which it is positioned, the outer edge of the plate 10 being substantially flush with the adjacent outer edge of the body portion, so that the inner edge of the plate 8, provides grooves 11 at opposite edges of the scale member 12, slide.

Positioned over the plates 9 and 10, are the plates 13 and 14 respectively, the plates 13 and 14 being substantially narrow, act as spacers, for the plates which rest thereon.

Resting on the plate 13, is a substantially wide plate 15, while the substantially wide plate 16 is positioned directly over the plate 14. These plates 15 and 16 have their outer edges arranged so that they will be substantially flush with the outer adjacent edges of the body portion, the inner longitudinal edges of the plates 15 and 16 extending beyond the inner longitudinal edges of the plates 13 and 14, providing a groove for the cursor, which is constructed of transparent sheet material.

Bolts 17 extend through openings in the plates 7, 8, 9 and 10, securing said plates to the body portion. As clearly shown by Figure 5, the openings in the plate 8, through which the bolts extend, are elongated transversely of the plate, permitting of slight movement of the plate 8 to permit the plate 8 to be adjusted with respect to the edges of the scale member 12, to properly align its guideways.

The plates 13, 14, 15 and 16, are shorter than the plates 7, 8, 9 and 10, and are also provided with openings to receive the bolts 18, which also extend through openings of the plates 7, 8, 9 and 10.

In the plates 13 and 14, the openings are transversely elongated, so that by loosening the bolts, the plates 13 and 14 may be adjusted to align the cursor guides with the markings of the scale member, to insure accurate perpendicularity of the cursor index line to the scales carried on the other sliding member. The reference character 19 designates a pivoted stop, which is mounted within the depression 6, the pivoted stop comprising an arm formed with a finger-piece 20 at one end thereof. The coiled spring 21 is positioned on the shaft of the stop 19, and engages the pivoted stop, normally urging the pivoted stop downwardly out of the path of travel of the scale member. When it is desired to operate the stop to move it to a position to be engaged by the scale member, the operator merely presses the finger-piece 20, which results in the opposite end of the stop rising to a point to be engaged by the scale member. The pivoted stop is of exceptional utility and importance, for the reason that the scale member 12 must, in starting a computation, occupy a certain fixed position, and at the end of the computation the scale member 12 must again be brought to the same position before the answer can be read from it under the hair line of the cursor. The pivoted stop offers a quick and easy means of placing the scale member 12 at this initial position which is also the final position. During a computation the scale member 12 must have freedom of motion throughout the length of its housing and automatic retraction of the stop permits the scale member 12 to slide freely over the stop, except when it is brought into action for the purpose above explained. Because of this stop, it is obvious that the scale member may be moved to one of its positions necessary in calculating, with accuracy, and with facility.

It will of course be understood that the scale member is supplied with graduations embodying a multiplicity of parallel lines of a scale, and another of the identical character but approximately one-half the size of the larger scale, and by means of which factors consisting of indicated square roots, may be involved in computations made with the use of the instrument. The cursor which is indicated by the reference character 22 is provided with an index line 23 that is disposed transversely thereof, the line 23 being designed to cooperate with indicating characters or graduations formed on the scale member, in computing a mathematical problem. In order that the cursor may be accurately and readily operated, a knob 24 is provided thereon, so that the operator may, by gripping the knob slide the cursor longitudinally of the body portion.

In view of the fact that the operation of a calculating instrument of this character, is well known to persons skilled in operating slide rules, and since the method of using the rule plays no part in the invention, the operation of the scale member and cursor will not be described in detail.

What is claimed:

1. In a calculating instrument, a body portion having a recess formed in the upper surface thereof and disposed adjacent to one end thereof, a scale member movable over the upper surface of the body portion and recess, a cursor movable over the scale member and having an index line thereon cooperating with the scale member in computing a mathematical problem, a movable stop mounted within the recess and accessible through one end of the body portion, means for normally holding the movable stop below the upper surface of the body portion, and said stop adapted to be moved extending one end thereof within the path of travel of the scale member moving over the body portion, engaging said scale member and limiting movement of the scale member in one direction.

2. In a calculating instrument, a body portion, a scale member slidably mounted on the body portion and movable longitudinally thereof, a cursor movable over the scale member and having an index line adapted to cooperate with the scale member in computing a mathematical problem, a movable stop pivotally connected with the body portion, one end of said stop adapted to be extended above the upper surfaces of the body portion to be engaged by the scale member, limiting movement of the scale member, in one direction, and means for normally urging the stop to its inactive position, below the upper surface of the body portion.

3. In a calculating instrument, a wide and elongated body portion, substantially rectangular in form, a pair of superimposed substantially wide marginal plates, mounted upon said body portion along each of the two longer sides of said body portion, one plate being disposed above the other plate, narrow plates disposed between the two substantially wide marginal plates and below the lower marginal plate along both edges of said body portion, the outer edges of both of said substantially wide and said narrow marginal plates being substantially coincident with the vertical sides of the body portion, the inner edges of the wide and narrow marginal plates adjacent each side of the body portion forming two inwardly facing grooves, one above the other, said plates having alignment openings formed therein, the openings of certain of the narrow marginal plates being transversely elongated, bolts extending through the openings and adapted to secure the plates in position, said elongated openings being arranged so that the narrow plates are adjusable transversely of the body portion, a scale member movable over the body portion and operating within the lower pair of opposed grooves and having a plurality of spaced parallel lines formed thereon, a transparent cursor having an index line, movable over the scale member and operating within the upper pair of opposed grooves, and said narrow plates having the elongated openings being so arranged that the narrow plates, the inner edges of which form the bottoms of the opposed grooves, are adjustable transversely of the body portion maintaining the bottoms of said grooves in close sliding contact with the edges of the scale member movable over the body portion, and with the edges of the cursor, maintaining the index line of the cursor at right angles to the plurality of spaced parallel lines formed on the scale member and which is movable over the body portion.

GEORGE H. MORSE.